Nov. 23, 1948.  E. H. LAND  2,454,515
LIGHT-POLARIZING SHEET OF MOLECULARLY ORIENTED TRANSPARENT
LINEAR HIGH POLYMER DYED WITH DICHROIC SUBSTANCE
AND PROCESS OF MANUFACTURE
Filed Oct. 29, 1938
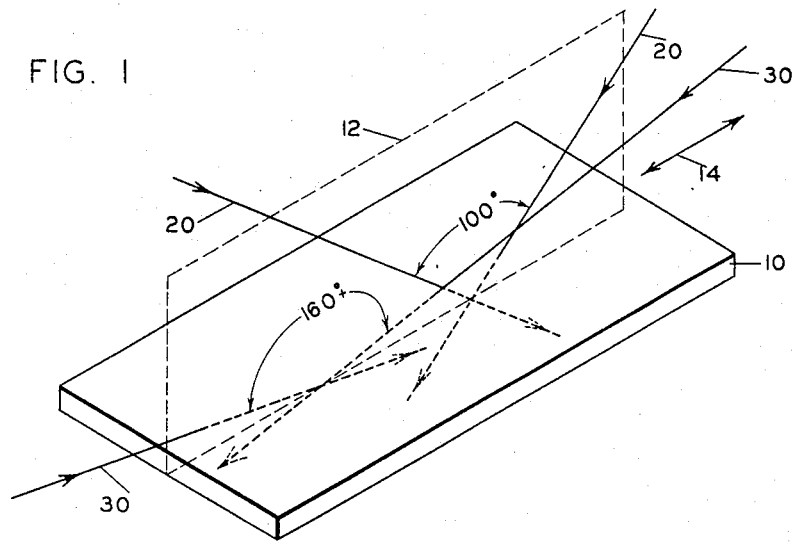
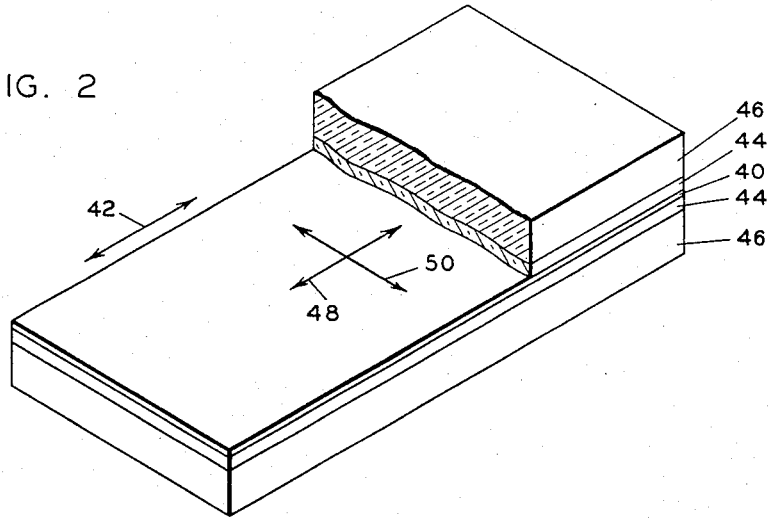
INVENTOR.
Edwin H. Land
BY Brown + Jones,
Attorneys Patented Nov. 23, 1948

2,454,515

UNITED STATES PATENT OFFICE 2,454,515

LIGHT-POLARIZING SHEET OF MOLECU-
LARLY ORIENTED TRANSPARENT LINEAR
HIGH POLYMER DYED WITH DICHROIC
SUBSTANCE AND PROCESS OF MANUFAC-
TURE

Edwin H. Land, Boston, Mass., assignor to
Polaroid Corporation, Dover, Del., a corpora-
tion of Delaware Application October 29, 1938, Serial No. 237,783

20 Claims. (Cl. 88—65)

This invention relates to a new and improved light-polarizer and to the process of manufacturing the same.

An object of the invention is to provide a light-polarizing sheet comprising a dichroic plastic. Other objects of the invention are to provide such a sheet comprising a cellulosic plastic or a vinyl compound; to provide such a polarizer comprising a transparent, dyed sheet; to provide such a polarizer wherein the sheet is dyed with an element, and more specifically with iodine, bromine, or a metal or semi-metal; to provide such a sheet wherein the sheet is dyed with a direct cotton dye; to provide such a sheet which is extended in the direction of one of its dichroic axes to substantially the limit of extension of its rubbery-elastic state; to provide means for holding such a sheet at the limit of its said extension or means for setting such a sheet at its said limit; and to provide such a sheet which shows throughout a predetermined portion of the spectrum substantial dichroism and no appreciable birefringence, and throughout another portion of the spectrum substantial birefringence and no appreciable dichroism.

Other objects of the invention are to provide a process for the manufacture of such a light-polarizing sheet; to provide such a process wherein a sheet of a plastic, and more specifically a sheet of a cellulosic compound or a vinyl compound is rendered rubbery-elastic by heating or swelling the sheet, and is then extended to substantially the limit of extension of its rubbery-elastic state, and is then set or held at the said limit of extension; and to provide such a process wherein at one stage the sheet is dyed so as to render it dichroic.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

For a fuller understanding of the invention, reference should be had to the accompanying drawings, in which:

Figure 1 is a diagrammatic view in perspective showing a polarizer prepared in accordance with the present invention and illustrating in connection therewith the directions of monochroism; and Figure 2 is a diagrammatic view in perspective, partly cut away, showing a lamination embodying a polarizer prepared in accordance with the present invention.

There has heretofore been developed a light-polarizing sheet which comprises a suspension of oriented, needle-shaped, light-polarizing particles in a light-transmitting plastic. The polarizing properties of this type of polarizer arise from the suspended crystalline particles. The plastic suspending medium serves essentially as a carrier and positioner of the polarizing particles.

Other forms of synthetic light-polarizers have been suggested. It has, for example, been suggested that a polarizer be formed by building up a deposit of oriented polarizing crystalline areas on a suitable transparent support. It has also been suggested that a polarizer might be obtained by flowing on to a normally anisotropic surface or a surface rendered anisotropic, as by rubbing, a solution of a dye. In each of these two forms the polarizer comprises a transparent support on which there is a deposit in the one case of oriented polarizing crystals and in the other case of a dye. In the latter case the polarizing properties of the combination possibly arise from the anisotropy of the support and its effect upon the deposited dye. In neither of these two forms is the polarizing crystal or the dye incorporated in the supporting sheet or plate, and hence polarizers of this type are easily destroyed unless the polarizing surface is protected by an additional overlying transparent element.

It is believed that of the types of synthetic polarizers described, the first, i. e., the sheet type, and the second, i. e., the deposit of polarizing crystals on a transparent support, are the only commercially practical synthetic polarizers as yet developed, for the third form has not as yet been commercialized, and tests have shown that the dichroism obtained by flowing a dye on to an anisotropic surface is at best inadequate for commerical usage.

This invention contemplates the provision of a different type of polarizer. In a preferred embodiment of the present invention a sheet of a plastic material, such for example as a sheet of a cellulosic compound, such as cellulose acetate or ethyl cellulose, or regenerated cellulose or a sheet of a vinyl compound, such for example as a plasticized vinyl acetal resin or other plastic, is rendered rubber-elastic, and while in this state is stretched or otherwise extended substantially to the limit of its rubber-elastic state. It is then either held in the stretched, extended position, or is set so that the deformation set up in the sheet is retained. At some stage of the process, for example after it has been stretched or before it has been stretched, the sheet is dyed, either by a suitable dye, such as a direct cotton dye or a suitable mordant dye, or by iodine or bromine or a metal, such as mercury, silver, gold, copper, arsenic, bismuth, antimony, selenium, tellurium, or the like. The resulting dyed sheet is found to possess high dichroism, in some cases over predetermined bands of wave lengths in the visible spectrum, and in other cases over substantially the entire range of the visible spectrum.

In its highly dichroic state, the preferred embodiment of the present invention shows substantially no birefringence over those portions of the spectrum in which it shows high dichroism, and over other portions of the spectrum, i. e., those in which it shows substantially no dichroism, the polarizer of the present invention is noticeably birefringent. It may also, in certain cases, show both dichroism and birefringence over certain portions of the spectrum, or even, in certain instances, little birefringence in any portion of the spectrum.

In the extended state previously described, the product of the present invention is so highly dichroic throughout at least a predetermined wave length band that the dichroism of the sheet cannot be increased appreciably by further extension in any direction. Furthermore, and presumably because of the extension to which the sheet has been subjected, the ratio of the tensile strength of the sheet in the direction of one of its dichroic axes to the tensile strength of the sheet in the direction of its other dichroic axis is a maximum.

The preferred embodiment of the present invention is a sheet or film which is substantially uniaxial. Such a sheet or film 10 is shown in Fig. 1, wherein arrow 14 represents the direction of extension of the sheet. If such a dichroic polarizer, for example a dichroic Cellophane, is examined from points in a plane normal to its surface and including the direction of extension of the sheet, such for example as the plane indicated by dotted lines 12 in Fig. 1, there will be two directions in which the sheet may be viewed and in which it will appear to be monochroic. These directions make equal but opposite angles with a normal to the surface of the sheet. These directions may be termed the directions of monochroism and are represented by arrows 20 and 30 in Fig. 1. For commercial dyed Cellophane, these directions are found to make angles with each other within the sheet of from approximately 90° to approximately 105°, as is indicated by arrows 20. For dichroic polarizing Cellophane of the type embodying the present invention, the directions of monochroism make with each other angles approximating 180° and preferably, in any event, in excess of 160°, as is indicated by arrows 30.

In addition to the aforesaid tests for determining whether the product of the present invention has reached its desired state, it should be noted that in the preferred state the product of the present invention shows substantially no polarized light interference effects through that portion of the spectrum in which it is highly dichroic, and the product of the preferred embodiment of the invention will transmit an incident beam of plane-polarized light vibrating in a direction at any angle to the dichroic axes of the sheet substantially free from any elliptical component.

The product of the present invention in its preferred form will transmit substantially more than 75% of one component of the incident beam within the wave length band for which the product is dichroic, and will transmit substantially less than 2% of the other component of the incident beam.

The product of the present invention is accordingly to be distinguished from the earlier types of polarizers already discussed by one or more of the properties previously mentioned.

In one form of the invention a sheet of regenerated cellulose is stained or dyed with either iodine, bromine, a metal, or a direct cotton dye, for example such cotton dyes as National Erie Black GXOO (Color Index No. 581), Amanil Black (C. I. 395), Amanil Fast Black (C. I. 545), Tintex Black, and Tintex Purple, or a mordant dye such as logwood. It is to be understood that many cotton dyes may be employed.

If the sheet of Cellophane is stained before being processed as hereinafter described, some degree of dichroism is generally to be noticed. This dichroism is, however, slight, and unprocessed dyed sheets of Cellophane are not considered suitable for use as polarizers generally.

To dye or stain the Cellophane sheet with iodine, a solution may be made by dissolving, for example, 2½ grams of potassium iodide in 30 grams of a saturated solution of zinc chloride. The Cellophane sheet may then be soaked in the solution until it is thoroughly wetted, care being taken, however, to see that the sheet does not rot or dissolve. Excess liquid may then be wiped from the sheet and the sheet subjected to the action of iodine vapor, at or slightly above room temperature, until it has become well stained, as for example a dark, reddish brown. At this stage of the process the sheet shows dichroism, as was previously indicated, but not such marked dichroism as is desired.

If, while the sheet is still moist, it is stretched or extended, for example, in warm air, air at a temperature slightly in excess of 100° C., care being taken not to burn out the iodine stain, the dichroism it displays becomes noticeably greater than in its unstretched state.

It should be noted that the dye or stain imparted to the sheet is fugitive to moisture. It is therefore desirable to protect the sheet from contact with moisture, for example by laminating it between sheets of glass or other plastic sheets.

This lamination may be accomplished by the use of an adhesive comprising a vinyllic compound, for example vinyl acetate plasticized with dibutyl phthalate. Such a lamination is shown in Fig. 2, wherein element 40 represents the dyed polarizing plastic which has been stretched in the direction of arrow 42 to the limits of its rubber-elastic state and bonded between glass plates 46 by means of adhesive layers 44. Arrows 48 and 50 represent the dichroic axes of polarizer 40. It will be noted that arrow 48 is parallel to arrow 42 and substantially perpendicular to arrow 50. Generally speaking, with such a polarizer the light transmitted will be vibrating parallel to arrow 50, the light vibrating parallel to arrow 48 being absorbed within the sheet.

In the foregoing process either the potassium iodide or the zinc chloride may be omitted from the imbibing solution. The results obtained are, however, generally inferior to those obtained if the process described is followed.

Similarly, sheets of Cellophane may be treated by bromine in the manner previously described in connection with the iodine treatment. Under such circumstances potassium bromide may be substituted for the potassium iodide, and bromine vapor for iodine vapor. Bromine gives an efficient polarizer throughout the blue.

As has already been indicated, the Cellophane sheets may be treated with cotton dyes. The dyeing may be carried out in an aqueous solution. An intense stain can be imparted to the Cellophane with slightly concentrated solutions of the dyes and with dyeing temperatures near the boiling point. For example, in a solution of 15 grams of Tintex Black per quart of water, an intense stain can be secured under the conditions mentioned in a few seconds.

It will be understood that the dichroism imparted by the dye depends upon the dye selected, and by selecting different dyes, dichroism throughout predetermined ranges of wave lengths in the visible spectrum may be obtained. By the use of black dyes, dichroism throughout substantially the entire wave length band in the visible spectrum can be secured. By the use of mixed dyes, dichroism throughout different wave length bands may be secured.

So also dichroic stains may be obtained in Cellophane sheets by staining or dyeing with metals, for example the metals previously described.

The dichroism of the stained or dyed sheet is substantially improved by treating the sheet in the following manner: The Cellophane sheet may be immersed in a swelling agent, such for example as a solution in water of sodium hydroxide and methanol, and more specifically a 5% solution of sodium hydroxide in equal parts of water and methanol. The sheet should remain in the solution until it has been thoroughly wetted, but should be removed before it has rotted or dissolved. When so wetted or swollen, it is found to be in a rubber-elastic state and the stretch imparted to it by extending the sheet may be substantially greater than that imparted to a sheet which has not been similarly treated.

The swollen or wetted sheet is preferably stretched substantially to the limit of extension of its rubber-elastic state. In this condition its dichroism is a maximum, and one dichroic axis coincides with the direction of stretch or extension. The sheet may be held in this condition by suitable holding means or by laminating the sheet to suitable supports, as for example in the manner shown in Fig. 2, or the swelling agent may be rinsed from the sheet, for example by means of a water rinse or a dilute acid bath, while the sheet is being held in stretched condition. When the swelling agent is removed the sheet remains set. It will, however, usually return to its unstretched condition if it is re-wetted or re-swollen with the swelling agent.

It should be noted that in the manufacture of sheets of regenerated cellulose the sheet may be formed by extrusion of a mixture of the cellulosic material and a swelling agent, and the extruded sheet may be passed into a fixing bath for the removal of the swelling agent. Under these circumstances if the extruded sheet is stretched as it is fed into the bath and held in stretched condition while the swelling agent is removed, a product which when dyed is suitable for use in the present invention may be obtained.

It will be understood that the treatment described may be employed either before the sheet is dyed or after it has been dyed. It will be apparent that treatment of the sheet after dyeing can only be carried out if the swelling and wetting agents do not attack the dye or stain. In this connection it should be pointed out that a Cellophane sheet stained with iodine may not be subjected to the wetting treatment previously described after the sheet has been stained, as the iodine stain is fugitive in aqueous media. The Cellophane sheet may, however, be after-treated with the wetting or swelling agent if it has been dyed with some cotton dyes.

In every case the extension of the treated sheet should preferably be substantially to the limit of its rubber-elastic stretch. Generally speaking, this means that the sheet should be extended substantially to, but just below, the point where it ruptures. This, however, is not a completely satisfactory test, for in many cases the plastic sheet will not rupture even if extended beyond the limit of its rubber-elastic state. This state and the preferred degree of extension, as heretofore described, is more particularly defined hereinafter.

Certain of the cellulosic plastics, and more particularly sheets of plasticized cellulose acetate, may be rendered rubber-elastic by heating the sheet, care being taken, however, not to heat the sheet to a point where it freely flows. The condition desired is not a condition generally termed "thermoplastic," but is more accurately a softening of the sheet without flow, so that it may be more readily stretched. The desired stretch is in every case an elastic stretch, i. e., the sheet should tend to return to its initial shape and form, or substantially thereto, when the stretch is released, the other conditions remaining constant. Under certain conditions a stretch beyond the rubber-elastic limit of the sheet will still leave a product with a limited rubber-elastic stretch, but the sheet will have become permanently deformed so that release of the stretch will not result in a return of the sheet substantially to its initial form. The sheet in its new form may, however, still be said to have a rubber-elastic state, and in that state it may be subjected to the type of stretch here desired.

As an example of the vinyl compounds which may be employed in the present invention, reference will be made to vinyl acetal resin having incorporated therewith triglycol dihexoate as a plasticizer or swelling agent. Such a resin may properly be said to be in the rubber-elastic state in the form in which it is marketed.

Highly dichroic sheets of vinyl acetal resin may be obtained in any of the following ways: 10 grams of the resin may be dissolved in 50 c. c. of butanol. To this may be added 2 c. c. of a 20% solution of ammonium iodide in Cellosolve and 1.7 c. c. of a 20% solution of iodine in butanol. The mix may be cast on a glass plate and dried to a deep green color. Strip from the plate and stretch the sheet and hold it in stretched condition until substantially free of solvent. High temperatures should be avoided.

Another method of treatment is to saturate xyline with ammonium iodide and iodine and immerse therein a sheet of vinyl acetal resin until the sheet is deeply stained. The xyline solution swells but does not dissolve the resin. The vinyl sheet should then be removed from the solution and stretched and then dried while being held in the stretched condition.

Another method is to take a sheet of plasticized vinyl acetal and expose the sheet to warm iodine fumes until it has been stained an orange-yellow, When the sheet is stretched, marked dichroism will be apparent.

The same condition arises if the stretched, untreated sheet has been dyed with a direct cotton dye.

Other methods of dyeing the resin sheet are to prepare a concentrated solution of the dye, for example Amanil Black (C. I. 395), in a 50-50 solution of water and denatured alcohol with a little soap added, and imbibe the sheet, for example vinyl acetal, in the solution. When the sheet has been stained it is stretched and dried. Or a solution of the vinyl compound in methanol may be dyed with a similar dye and a film cast on glass. When nearly dry this is stripped from the glass, stretched and dried in a stretched condition.

Many other light-polarizing sheets or films embodying the invention may be produced. For example, a sheet of regenerated cellulose such as Cellophane may be dyed with a metal. Very excellent results are obtained where such a sheet is rendered rubber-elastic, stretched to the limit of its rubber-elastic state, and then dyed with mercury. If such a stretched sheet is imbibed in an aqueous solution of a salt of mercury containing oxygen, such for example as mercuric or mercurous nitrate, or mercuric acetate, or mercurous sulphate, and the sheet then heated until the salt has been reduced to metallic mercury, a highly efficient light-polarizer is obtained. The sheet may be dyed with the mercury either before or after stretching, but best results are usually obtained if the dyeing succeeds the stretching.

A sheet of cellulose acetate similarly treated gives good results.

The salt of mercury may be reduced by means of a chemical reducing agent, if desired, such for example as sodium hydrosulphite or paraphenylenediamine.

Moreover, if a wetted sheet of Cellophane is exposed to mercury vapor and then stretched, or if a stretched and wetted sheet is exposed to mercury vapor, a satisfactory polarizer may be obtained, i. e., the sheet may be directly dyed by the metallic vapor.

Speaking generally, sheets of the plastic materials previously described may be dyed by imbibing the sheets in solutions of a reducible metallic salt and by then reducing the salt to a metal and stretching the sheets to the limit of their rubber-elastic state. The stretch may take place either before or after the reduction of the salt. The reduction of the salt may be accomplished generally by the use of a chemical reducing agent, such as sodium hydrosulphite. Light-polarizing sheets have been produced in this manner by the use of copper sulphate, silver nitrate, gold chloride, arsenious acid anhydride, antimony potassium tartrate, bismuth subnitrate, selenious acid, stannous chloride, nickelous sulphate, tellurous acid, and other metallic salts.

Under certain circumstances special treatments are to be preferred. If, for example, it is desired to employ platinum as the metallic dye, a preferred treatment comprises dyeing the sheet with a solution of equal parts of potassium chloroplatinite, ferric oxalate and ferric chlorate. The sheet is then exposed to ultraviolet radiation and then treated with potassium oxalate.

If it is desired to dye with palladium, a satisfactory product may be secured by using any commercially available palladium sensitizing set and dyeing the plastic sheet with the mixture intended for strong prints. The sheet is then exposed to ultraviolet radiation and reduced with potassium oxalate.

If bismuth is to be employed as the metallic dye, a stretched sheet of Cellophane, for example, may be imbibed in a solution of bismuth subnitrate in dilute hydrochloric acid. The sheet is then dried and wiped with a concentrated solution of hydrazine hydrate. The bismuth is reduced in about a day. The reduction should preferably not be accelerated by employing heat.

It is to be understood that the present invention contemplates the use of metals in the processes indicated, whether the reduction be to the metal or to a metallic sulphide.

In addition to the dyes previously mentioned as suitable, attention might be called to the following as indicative of many dyes which may be suitably employed: Niagara Blue (2B) (C. I. 406), Solantine Red (8BL) (C. I. 278), Niagara Navy Blue (BW), Erie Green (MT) (C. I. 593), Erie Garnet B (C. I. 375), Solantine Black (L) (Prototype No. 24), made by diazotizing amino salicylic acid, coupling with alpha naphthylamine, rediazotizing the amino azo body thus formed and coupling with gamma acid in alkaline solution, and Purple (Diamond).

As has been previously indicated, mixtures of dyes may be employed. A mixture, for example, of Niagara Blue (C. I. 406) and Solantine Red (C. I. 278), or a mixture of Erie Green (C. I. 583) and Erie Garnet (C. I. 375), when used in the process of the present invention, gives a polarizer which polarizes substantially throughout the entire visible spectrum. A black dye, such for example as Erie Black (C. I. 582), may be added to the mixture if desired. The processes previously described are suitable for use with all the dyes mentioned, and it is to be understood that many other dyes may be similarly employed.

Under certain circumstances the treatment of the plastic sheet, such as the sheet of Cellophane, to render it rubber-elastic may be modified if desired. A solution of 100 grams of sodium hydroxide in 500 c. c. of water may be prepared and cooled, and to this may be added 300 c. c. of methanol and 250 c. c. of acetone. The Cellophane may be soaked in the solution for from five to ten minutes, and it may then be stretched to the limit of its rubber-elastic state and heated to about 90° C. It may then be washed in dilute sulphuric acid and thereafter in water.

The various treatments specified above are understood to be illustrative merely and not exclusive. Many other plastics than those specified may be employed, and many other dyes or stains may be used. This invention contemplates the use of all such dyes and stains and all such plastics as when employed together give a product which may be rendered rubber-elastic, either by heating or by swelling, or otherwise, and which when stretched to the limit of its rubber-elastic state shows marked dichroism throughout at least a portion of the visible spectrum.

Glass or other vitreous material is not to be deemed within the term "plastic" as used herein, but that term is intended to include regenerated cellulose.

The term "dyeing" as used herein is intended to include imparting to a material the property of absorbing certain frequencies of light by adding thereto another substance. It is intended to include such treatment where the added substance is an element, or a metallic compound, or a stain, or a non-metallic dye.

The term "rubber-elastic state" as used herein is intended to describe an elastic condition which is closely similar to the elasticity possessed by vulcanized or cured rubber. It is intended to describe a condition in which the plastic may be stretched or extended an appreciable amount without permanent distortion or alteration in the structure of the sheet. Hence it is intended to describe a condition such that when the stress or strain is relieved the sheet tends to return to its original form and shape. It is intended to describe such a condition where that condition is inherent in the material, for example in plasticized vinyl acetal resin, or is acquired by the material when it is in a heated condition, for example in the case of unplasticized vinyl acetal resin, or when it has been subjected to a swelling or wetting agent, for example Cellophane wetted with an aqueous solution of sodium hydroxide.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

Having described my invention, what I claim as new and desire to be secured by Letters Patent is:

1. The process of making a light polarizer, comprising rendering rubber-elastic a sheet of a transparent, linear, high polymeric plastic material, extending said sheet substantially to the limit of extension of its rubber-elastic state, setting said sheet in said extended condition, and rendering said sheet dichroic by dyeing said sheet with a dichroic stain at one stage of said process.

2. The process of making a light polarizer, comprising rendering rubber-elastic a sheet of a transparent, linear, high polymeric plastic material, extending said sheet substantially to the limit of extension of its rubber-elastic state, setting said sheet in said extended condition, and at one stage of said process rendering said sheet dichroic by applying thereto a stain containing iodine.

3. The process of making a light polarizer, comprising rendering rubber-elastic a sheet of a transparent, linear, high polymeric plastic material, extending said sheet substantially to the limit of extension of its rubber-elastic state, setting said sheet in said extended condition, and rendering said sheet dichroic by dyeing said sheet at one stage of said process with a dichroic direct cotton dye.

4. The process of making a light polarizer, comprising rendering rubber-elastic a sheet of a transparent, linear, high polymeric plastic material, extending said sheet substantially to the limit of its rubber-elastic state, rendering said sheet dichroic by applying thereto a dichroic stain at one stage of said process, and laminating said sheet between glass sheets while in said extended condition.

5. The process of forming a light polarizer, which comprises dyeing a sheet of regenerated cellulose with a dichroic dye, rendering said sheet rubber-elastic, extending said sheet substantially to the limit of extension of its rubber-elastic state, and setting said sheet in said extended condition.

6. The process of forming a light polarizer, which comprises dyeing a sheet of regenerated cellulose with a dichroic dye, rendering said sheet rubber-elastic by applying sodium hydroxide thereto, extending said sheet substantially to the limit of extension of its rubber-elastic state, and setting said sheet in said extended condition.

7. The process of making a light polarizer, comprising rendering a sheet of a transparent, linear, high polymeric plastic material rubber-elastic, dyeing said sheet with a dichroic dye, extending said sheet while in the rubber-elastic state until the angle formed by the directions of monochroism within said sheet is greater than 165°, and setting said sheet in said extended condition.

8. The process of forming a light polarizer, which comprises rendering a sheet of regenerated cellulose rubber-elastic by swelling said sheet, stretching said sheet substantially to the limit of extension thereof while the sheet is in said rubber-elastic state, setting said sheet in said extended condition, and dyeing said stretched sheet with a dichroic dye.

9. The process of forming a light polarizer, which comprises rendering a sheet of regenerated cellulose rubber-elastic by swelling said sheet, thereafter simultaneously dyeing said sheet with a dichroic dye and stretching said sheet while it is in said rubber-elastic state substantially to the limit of extension thereof, and setting said sheet in said extended condition.

10. The process of forming a light polarizer, comprising rendering a sheet of a transparent, linear, high polymeric plastic material rubber-elastic, stretching said sheet substantially to the limit of extension thereof while it is in said state, setting said sheet in said extended condition, dyeing said sheet at one stage in the process by applying thereto a reducible metallic compound, and reducing said compound to render said sheet dichroic.

11. The process of making a light transmitting and polarizing body which comprises forming a uniform thin layer of a heated transparent linear, high molecular weight, organic plastic material, applying a force to said plastic material while it is heated in such direction and for such duration as to align the molecules of said plastic in parallelism, permitting said plastic to harden thereby holding said molecules in permanent parallel alignment and at some stage of the process incorporating a dichroic dye within said layer whereby said layer becomes light polarizing.

12. A plane polarizing film having a high degree of transparency for polarized light and comprising a light-polarizing substance dispersed throughout light-transmitting, high molecular weight synthetic linear polymer which has been extended under stress in the solid unoriented state with the polarizing substance contained in the solid polymer to a state of permanent high linear extension and molecular orientation of the polymer and of the polarizing substance in the direction of the stress, said plane polarizing film exhibiting a high degree of permanent orientation up to temperatures approaching the melting point of the polymer.

13. A plane polarizing film comprising a polymer exhibiting molecular orientation upon X-ray examination, and a finely divided polarizing agent consisting of particles having a long and a short axis dispersed throughout said polymer and oriented with the long axis of the particles in substantial parallelism with the direction in which said polymer is oriented, said polymer being a high molecular weight, synthetic linear polymer which has been extended under stress in the solid unoriented state with the polarizing agent contained in the solid polymer to a state of permanent high linear extension and molecular orientation of the polymer and of the polarizing agent in the direction of the stress, said plane polarizing film exhibiting a high degree of permanent orientation in the polymer and in the polarizing substance up to temperatures approaching the melting point of the polymer.

14. The polarizing film set forth in claim 13 in which said polarizing agent is a colloidal needle-like asymmetric metal.

15. The polarizing film set forth in claim 13, in which said polarizing agent is colloidal needle-like asymmetric metallic bismuth.

16. The polarizing film set forth in claim 12 in which said polarizing substance is a water-soluble azo dye.

17. A plane polarizing sheet comprising a light-transmitting, high molecular weight, synthetic, linear polymeric plastic of the class capable of being rendered rubber-elastic, said sheet having incorporated therewith a dichroic dye, the molecules of said plastic and the dichroic material incorporated therewith being oriented to substantial parallelism, said sheet having been so highly extended in the rubber-elastic state that the directions of monochroism within said sheet make with each other an angle greater than 160°.

18. A polarizing sheet such as claimed in claim 17 wherein the dichroic dye comprises iodine.

19. A plane polarizing sheet comprising regenerated cellulose having incorporated therewith a dichroic dye, the molecules of said sheet and the dichroic material incorporated therewith being oriented to substantial parallelism, said sheet having been so highly extended in the rubber-elastic state that the directions of monochroism within said sheet make with each other an angle greater than 160°.

20. A light polarizer such as claimed in claim 19 wherein the dichroic dye comprises iodine.

EDWIN H. LAND.

REFERENCES CITED

The following references are of record in the file of this patent:

UNITED STATES PATENTS

| Number | Name | Date |
|---|---|---|
| 1,378,443 | Clavel | May 17, 1921 |
| 1,601,289 | Brandenberger | Sept. 28, 1926 |
| 1,642,774 | Grange | Sept. 20, 1927 |
| 1,709,470 | Hall | Apr. 16, 1929 |
| 1,724,670 | Lilienfeld | Aug. 13, 1929 |
| 1,873,951 | Zocher | Aug. 30, 1932 |
| 1,938,734 | Withrow | Dec. 12, 1933 |
| 1,957,045 | Kelly | May 1, 1934 |
| 1,962,132 | Bradshaw | June 12, 1934 |
| 2,011,553 | Land | Aug. 13, 1935 |
| 2,041,138 | Land | May 19, 1936 |
| 2,070,119 | Fischer | Feb. 9, 1937 |
| 2,072,858 | Ellis | Mar. 9, 1937 |
| 2,073,414 | Dosne | Mar. 9, 1937 |
| 2,078,254 | Land | Apr. 27, 1937 |
| 2,141,169 | Catlin | Dec. 27, 1938 |
| 2,142,389 | Wiessenberg | Jan. 3, 1939 |
| 2,144,356 | Alles | Jan. 17, 1939 |
| 2,236,972 | Kasemann | Apr. 1, 1941 |
| 2,246,087 | Bailey et al. | June 17, 1941 |
| 2,359,428 | Land | Oct. 3, 1944 |

FOREIGN PATENTS

| Number | Country | Date |
|---|---|---|
| 419,295 | Great Britain | Nov. 5, 1934 |
| 419,826 | Great Britain | Nov. 19, 1934 |
| 476,023 | Great Britain | Nov. 30, 1937 |

OTHER REFERENCES

Ambronn, Annalen Der Physik, vol. 34, 1888, pages 340–347.

Preston, Society of Dyers and Colourists Journal, vol. 47, 1931, pages 312–319, publ. Bradford, Yorkshire, England.

J. Strachan, in Nature, vol. 125, Jan.–June 1930, page 671, publ. Macmillan & Co., Ltd., New York.

McNally et al., Journal of Physical Chemistry, vol. 34, pages 165–172.

Certificate of Correction

Patent No. 2,454,515 November 23, 1948

EDWIN H. LAND

It is hereby certified that errors appear in the printed specification of the above numbered patent requiring correction as follows:

Column 3, line 68, for the word "through" read *throughout*; column 8, line 31, for the numeral "583" read *593*; column 10, lines 39 and 40, for "dichloric" read *dichroic*; and that the said Letters Patent should be read with these corrections therein that the same may conform to the record of the case in the Patent Office.

Signed and sealed this 13th day of June, A. D. 1950.

[SEAL]

THOMAS F. MURPHY,
*Assistant Commissioner of Patents.*